(12) United States Patent
Morris et al.

(10) Patent No.: US 8,266,139 B2
(45) Date of Patent: Sep. 11, 2012

(54) SYSTEM AND INTERFACE FOR CO-LOCATED COLLABORATIVE WEB SEARCH

(75) Inventors: Meredith June Morris, Bellevue, WA (US); Saleema Amershi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 86 days.

(21) Appl. No.: 12/029,616

(22) Filed: Feb. 12, 2008

(65) Prior Publication Data
US 2009/0204902 A1 Aug. 13, 2009

(51) Int. Cl.
G06F 7/00 (2006.01)
G06F 17/30 (2006.01)
G06F 3/00 (2006.01)
G06F 3/048 (2006.01)

(52) U.S. Cl. ........ 707/722; 707/706; 707/736; 707/770; 715/751; 715/754; 715/764

(58) Field of Classification Search .................. 707/706, 707/722, 736, 770; 715/751, 754, 764
See application file for complete search history.

(56) References Cited

U.S. PATENT DOCUMENTS

| | | | |
|---|---|---|---|
| 6,022,156 A * | 2/2000 | Blish | 400/472 |
| 6,732,088 B1 | 5/2004 | Glance | |
| 6,745,178 B1 | 6/2004 | Emens et al. | |
| 6,894,703 B2 | 5/2005 | Vernier et al. | |
| 7,174,364 B1 * | 2/2007 | Aravamudan et al. | 709/203 |
| 7,593,974 B2 * | 9/2009 | Suzuki et al. | 1/1 |
| 7,711,738 B1 * | 5/2010 | Kraft et al. | 707/752 |
| 7,825,896 B2 * | 11/2010 | Yoshida | 345/157 |
| 2002/0059308 A1 * | 5/2002 | Kawashima et al. | 707/200 |
| 2003/0023670 A1 * | 1/2003 | Walrath | 709/203 |
| 2005/0198578 A1 | 9/2005 | Agrawala et al. | |
| 2006/0155728 A1 * | 7/2006 | Bosarge | 707/100 |
| 2006/0218500 A1 * | 9/2006 | Sauve et al. | 715/767 |
| 2007/0070066 A1 | 3/2007 | Bakhash | |
| 2007/0226183 A1 | 9/2007 | Hart et al. | |
| 2008/0033917 A1 * | 2/2008 | Jones et al. | 707/3 |
| 2008/0222295 A1 * | 9/2008 | Robinson et al. | 709/227 |
| 2010/0030734 A1 * | 2/2010 | Chunilal | 707/3 |

OTHER PUBLICATIONS

Michael B. Twidale, et al. Collaborative Browsing and Visualisation of the Search Process. Aslib Proceedings, 1996, 48(7-8), 177-182, ISBN: 0 85142 383 3 http://www.comp.lancs.ac.uk/computing/research/cseg/projects/ariadne/docs/elvira96.html. Last accessed Nov. 7, 2007, 8 pages.

(Continued)

*Primary Examiner* — Rehana Perveen
*Assistant Examiner* — Huen Wong

(57) ABSTRACT

Systems and methods are provided to perform collaborative retrieval, communication, and navigation of electronic content in a co-located environment. In an illustrative implementation, a collaborative content environment comprises a collaborative content interface engine, and an instruction set comprising at least one instruction providing instructions to the collaborative content interface engine to process data representative of inputs from two or more cooperating interface devices to allow for the retrieval, communication, search, and navigation of electronic content. In the illustrative implementation, the collaborative content interface engine can present retrieved, communicated, searched, and/or navigated data according to a selected display paradigm. The display paradigm can include one or more display portions of a display pane comprising data responsive to the inputs received from the two or more cooperating interface devices.

15 Claims, 8 Drawing Sheets

OTHER PUBLICATIONS

Meredith Ringel Morris. Collaborating Alone and Together: Investigating Persistent and Multi-User Web Search Activities. SIGIR'07, Jul. 23-27, 2007, Amsterdam, Netherlands. Copyright 2007 ACM 1-58113-000-0/00/0004 ftp://ftp.research.microsoft.com/pub/tr/TR-2007-11.pdf. Last accessed Nov. 7, 2007, 9 pages.

Henry Lieberman, et al. Let's Browse: A Collaborative Web Browsing Agent. IUI 99 Redondo Beach CA USA. ACM 1999 1-58113-098-8/99/0 http://citeseer.ist.psu.edu/cache/papers/cs/1310/http:zSzzSzagents.www.media.mit.eduzSzgroupszSzagentszSzpublicationszSzlets-browse-iui99zSzpaper.pdf/lieberman99lets.pdf. Last accessed Nov. 7, 2007, 4 pages.

Kyoung Park, et al. The Impact of Display-rich Environments for Enhancing Task Parallelism and Group Awareness in Advanced Collaboration Environments. WACE '03, Jun. 22, 2003, Seattle, WA. http://www.evl.uic.edu/park/papers/WACE03/Continuum-WACE2003.pdf. Last accessed Nov. 7, 2007, 12 pages.

Grant Wallace, et al. A Multi-Cursor X Window Manager Supporting Control Room Collaboration http://www.cs.princeton.edu/omnimedia/papers/multicursor.pdf. Last accessed Nov. 7, 2007, 7 pages.

Brad A. Myers. The Pebbles Project: Using PCs and Hand-held Computers Together http://www.cs.cmu.edu/~pebbles/papers/pebblesdemo.pdf. Last accessed Nov. 7, 2007, 2 pages.

Mark Van Setten, et al. Collaborative Search and Retrieval: Finding Information Together https://doc.telin.nl/dsweb/Get/Document-8269/GigaCE-Collaborative_Search_and_Retrieval_Finding_Information_Together.pdf. Last accessed Nov. 7, 2007, 10 pages.

\* cited by examiner

SYSTEM AND INTERFACE FOR CO-LOCATED COLLABORATIVE WEB SEARCH

BACKGROUND

Although computers have become more plentiful in recent years, shared computer use remains common in many settings. For example, in U.S. public schools, the ratio of students to computers is nearly four to one, and the number of Internet-enabled computers available in U.S. public libraries is approximately three for every five thousand people. In developing countries, these ratios can be even more skewed. For example in rural schools in developing countries the student-to-computer ratio can be as high as ten to one. Even when resource constraints are not a factor, the social and pedagogical benefits of face-to-face collaborations and shared viewing of information can be a compelling reason for collaborators to share a single computer.

Web search is an increasingly common online activity, and is often undertaken in shared-computer settings. For example, students often work together to complete homework assignments, friends seek information about entertainment opportunities, family members jointly plan vacation travel, and colleagues jointly conduct research for their projects. However, sharing computers for a joint Web search can be frustrating and inefficient when, for instance, individual collaborators disagree on search queries to issue, Web pages to view, and Web page content to explore.

Commercial search engines and Web browsers focus on single-user scenarios. However, collaboration is an important aspect of the information retrieval behaviors of users in domains such as schools, libraries, and offices. For example, research on the collaborative information retrieval activities of library users at a university has identified several common types of collaborative search practices, including "joint search", in which a group of people gathers around a single computer.

Current practices include proposed systems for remote collaboration on Web tasks, such as browsing and searching. Other currently deployed practices include, co-located collaborative search of databases through visualization of a user's search process that can be shared with others, co-located search of digital photo collections by groups seated around an interactive tabletop display, and a systems that automatically divides a single Web page into multiple components distributed among participating handheld devices of co-located collaborators for group browsing in a mobile setting. Additionally, current practices further include, the generation of personalized views of Web pages for multiple co-located users based on the currently available devices (e.g., laptops, PDAs, etc.), and enabling multiple PDAs to control a Web browser on a shared display. However, current practices do not contemplate a collaborative Web search session in a co-located setting when several people are gathered around a single computer performing search operations using various input modalities to input search queries/commands and to navigate through content results.

From the foregoing it is appreciated that there exists a need for systems and methods to ameliorate the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein allows for systems and methods to perform collaborative retrieval, communication, and navigation of electronic content in a co-located environment. In an illustrative implementation, a collaborative content environment comprises a collaborative content interface engine, and an instruction set comprising at least one instruction providing instructions to the collaborative content interface engine to process data representative of inputs from two or more cooperating interface devices to allow for the retrieval, communication, and navigation of electronic content. In the illustrative implementation, the collaborative content interface engine can present retrieved, communicated, and/or navigated data according to a selected display paradigm.

In an illustrative implementation, two or more cooperating interface devices cooperatively operate with a collaborative computing environment which is electronically connected to a communications network such as the Internet or World Wide Web. In the illustrative implementation, the two or more cooperating interface devices can comprise input interface devices comprising pointing devices, navigation devices, cooperating mobile devices, and text input devices. In the illustrative implementation, inputs electronically (e.g., fixed wire and/or wirelessly) received from the two or more cooperating interface devices can be processed by the exemplary content interface engine cooperating with a computing application operative on the collaborative computing environment to retrieve, communicate and/or navigate data on the computing application.

In an illustrative operation, one or more received inputs representative of a request for the retrieval, search, communication, and/or navigation of data received from the two or more collaborative interface devices can be processed by the exemplary content interface engine operative with an exemplary cooperating computing application to retrieve, communicate, search, and/or navigate data for display by the cooperating computing application displayable according to a selected display paradigm.

In the illustrative implementation, a selected display paradigm can comprise a display pane comprising one or more data navigation/display portions comprising a query queue, a page queue, an identity region, a summary region, and a notes region. In the illustrative implementation, the display portions can display data responsive to the inputs received by the two or more cooperating interface devices.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
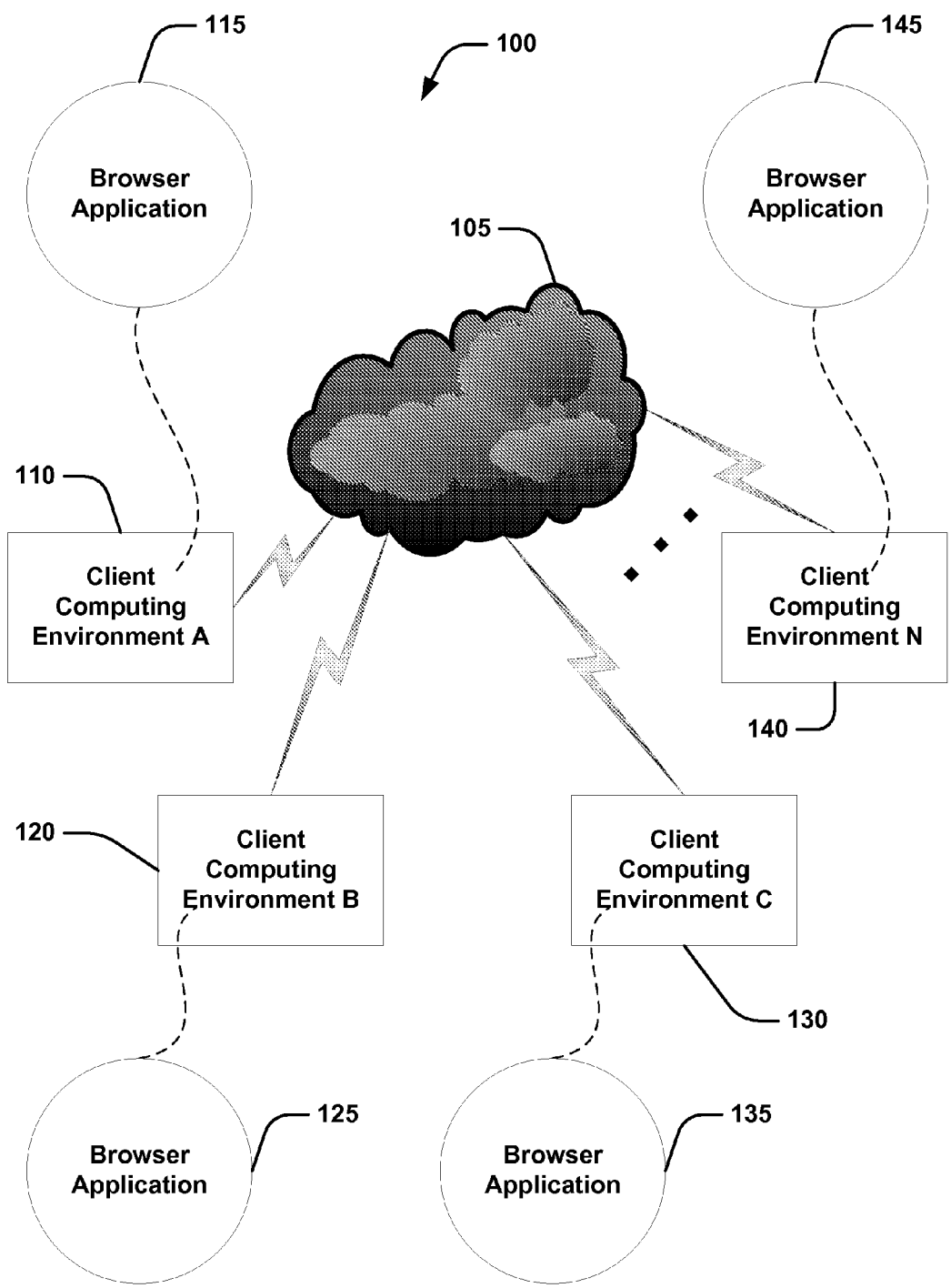
FIG. 1 is a block diagram of one example of an illustrative computing environment allowing for retrieval, communication, and navigation of electronic content in accordance with the herein described systems and methods.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Collaborative Electronic Content Session:

FIG. 1 describes an exemplary electronic content communication environment 100. As is shown in FIG. 1, electronic content communication environment 100 comprises server network 105 (e.g., the Internet or the World Wide Web) operatively coupled to a plurality of client computing environments such as client computing environment A 100, client computing environment B 120, client computing environment C 130, up to and including client computing environment N 140. Further, as is shown in FIG. 1, the plurality of client computing environment s operate exemplary browser computing applications. As is shown, client computing environment A 110 operates browser application 115, client computing environment B 120 operates browser application 125, client computing environment C 130 operates browser application 135, up to and including client computing environment N 140 operating browser application 145.

In an illustrative operation, the plurality of client computing environments can communicate electronic data between each other and/or with server network 105. The communication of electronic data can be managed by the exemplary browser applications operating on the plurality of client computing environments. In the illustrative operation, the browser applications can operate to perform various operations and features including but not limited receiving data inputs and displaying for display and/or navigation retrieved electronic data.

Figure 2:
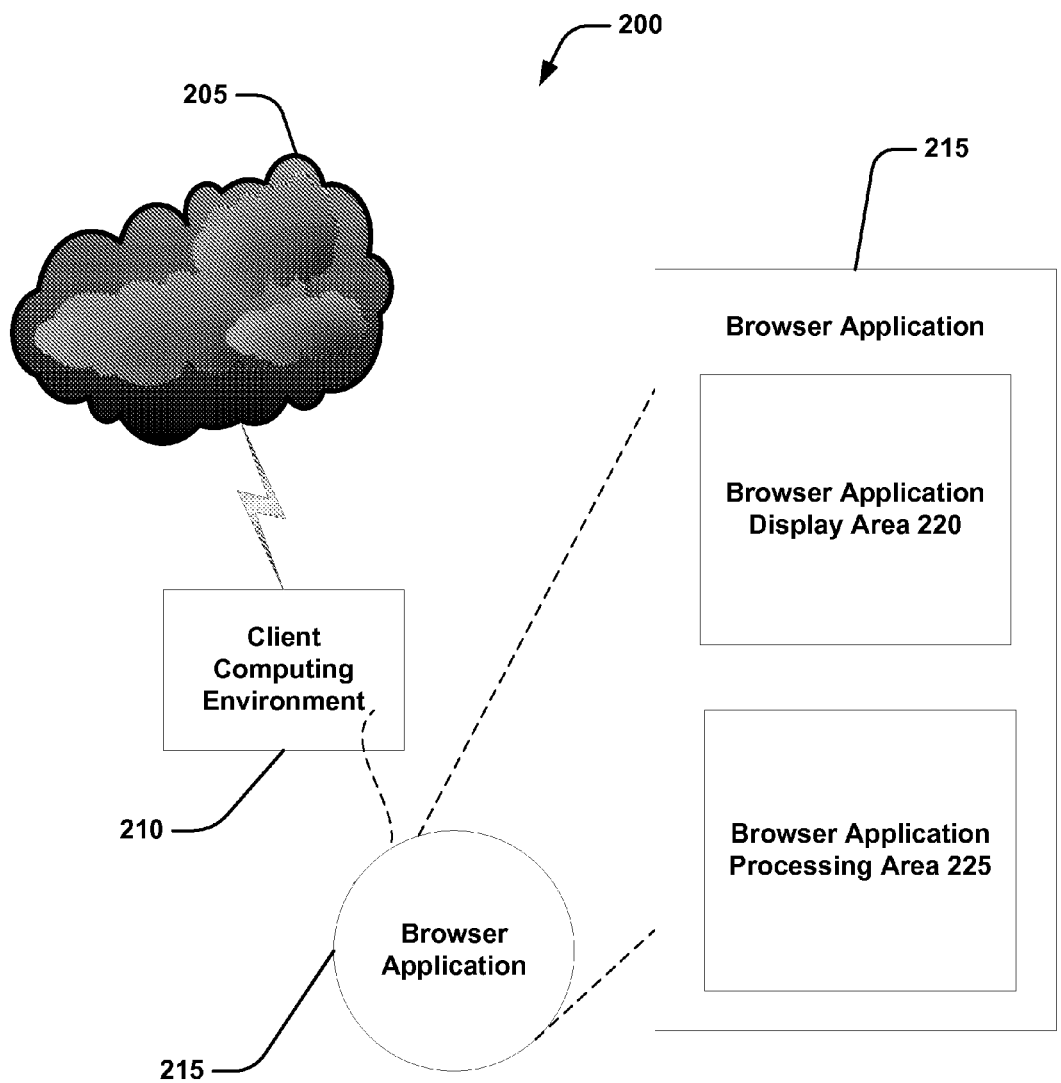
FIG. 2 is a block diagram of exemplary components of an illustrative computing environment allowing for the retrieval, communication, and navigation of electronic content in accordance with the herein described systems and methods.

FIG. 2 describes an exemplary electronic content environment 200. As is shown in FIG. 2, electronic content environment 200 comprises sever network 205, client computing environment 210 operating browser application 215. Further, as is shown, browser application 215 comprises browser application display area 220 and browser application processing area 225. In an illustrative operation, a participating user (not shown) can interface with client computing environment 210 through browser application 215. In the illustrative operation, browser application 215 can receive one or more inputs to retrieve, search, communicate, and/or navigate electronic content. Illustratively, the input can be processed by browser application processing area 225 to allow for the display and/or navigation of electronic content in browser application display area 220.

Figure 3:
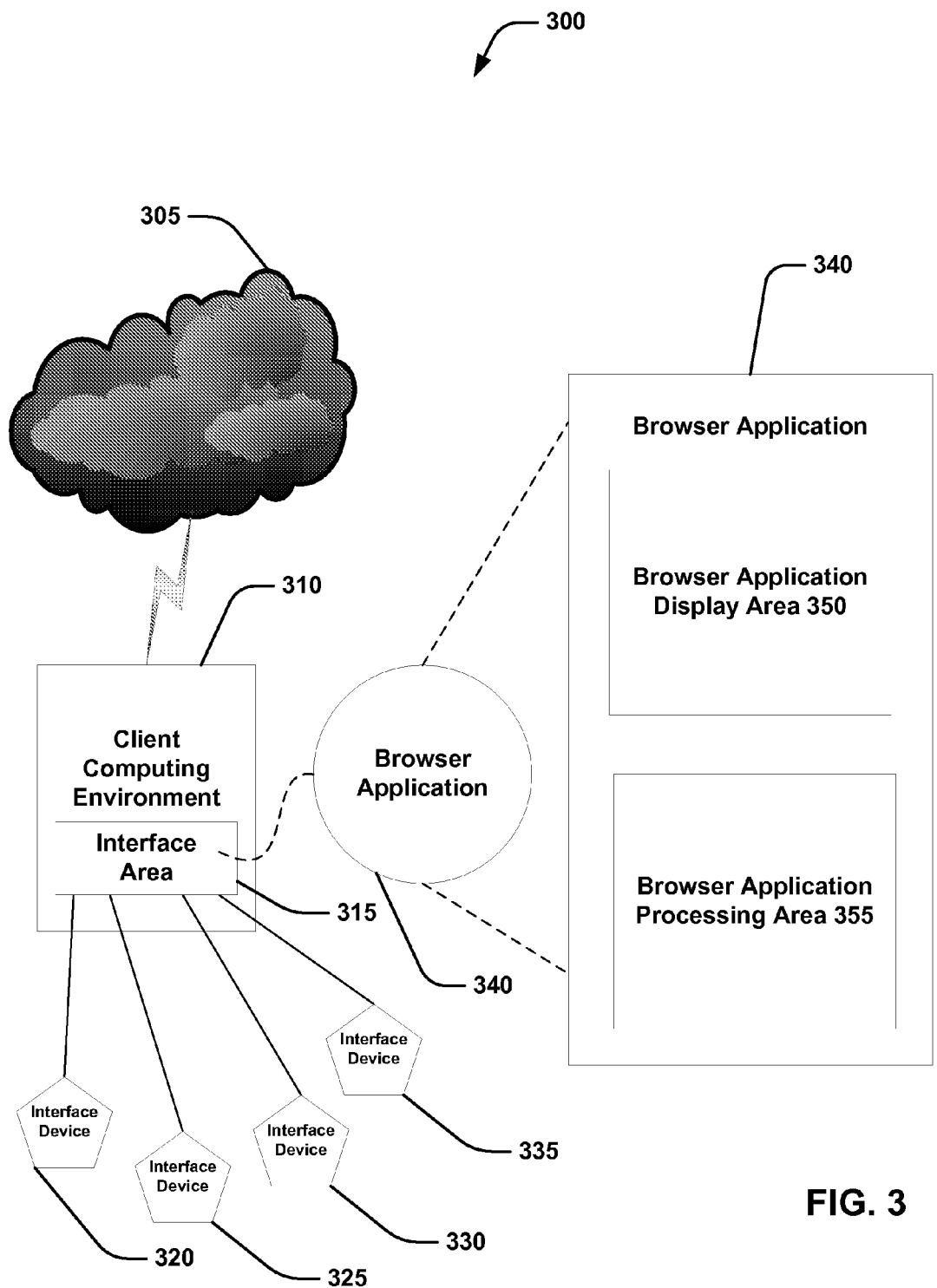
FIG. 3 is a block diagram of exemplary components of an illustrative computing environment allowing for the collaborative, retrieval, communication, and navigation of electronic content in accordance with the herein described systems and methods.

FIG. 3 schematically illustrates collaborative electronic content environment 300. As is shown in FIG. 3, collaborative electronic content environment 300 comprises server network 305, client computing environment 310 having interface engine 315 and operating browser application 340, and a plurality of interface devices, 310, 325, 330, and 335. Further as is shown, browser application comprises browser application display area 350 and browser application processing area 355. In an illustrative operation, participating users (not shown) can interface with client computing environment 310 through browser application 340 using the plurality of interface devices 320, 325, 330, and 335. In an illustrative implementation, one of the plurality of interface devices can act as a controlling interface device operable to exert control over one or more features/operations of browser application 340 such that the non-controlling interface devices are operable to control one or more pointers provided by browser application 340. The availability of a plurality of browser application pointers allows participating users (not shown) to indicate preference for electronic content retrieved and displayed by browser application 340 responsive to one or more inputs provided by interface devices 320, 325, 330, and 335. The inputs representative of requests for electronic content can be processed by interface engine 315 operating on client computing environment 310 and cooperating with browser application 340 to display retrieved content (e.g., retrieved from one or more cooperating server computing environments (not shown) of server network 305) according to processing instructions provided by browser application processing area 355 for display in browser application display area 350.

Figure 4:
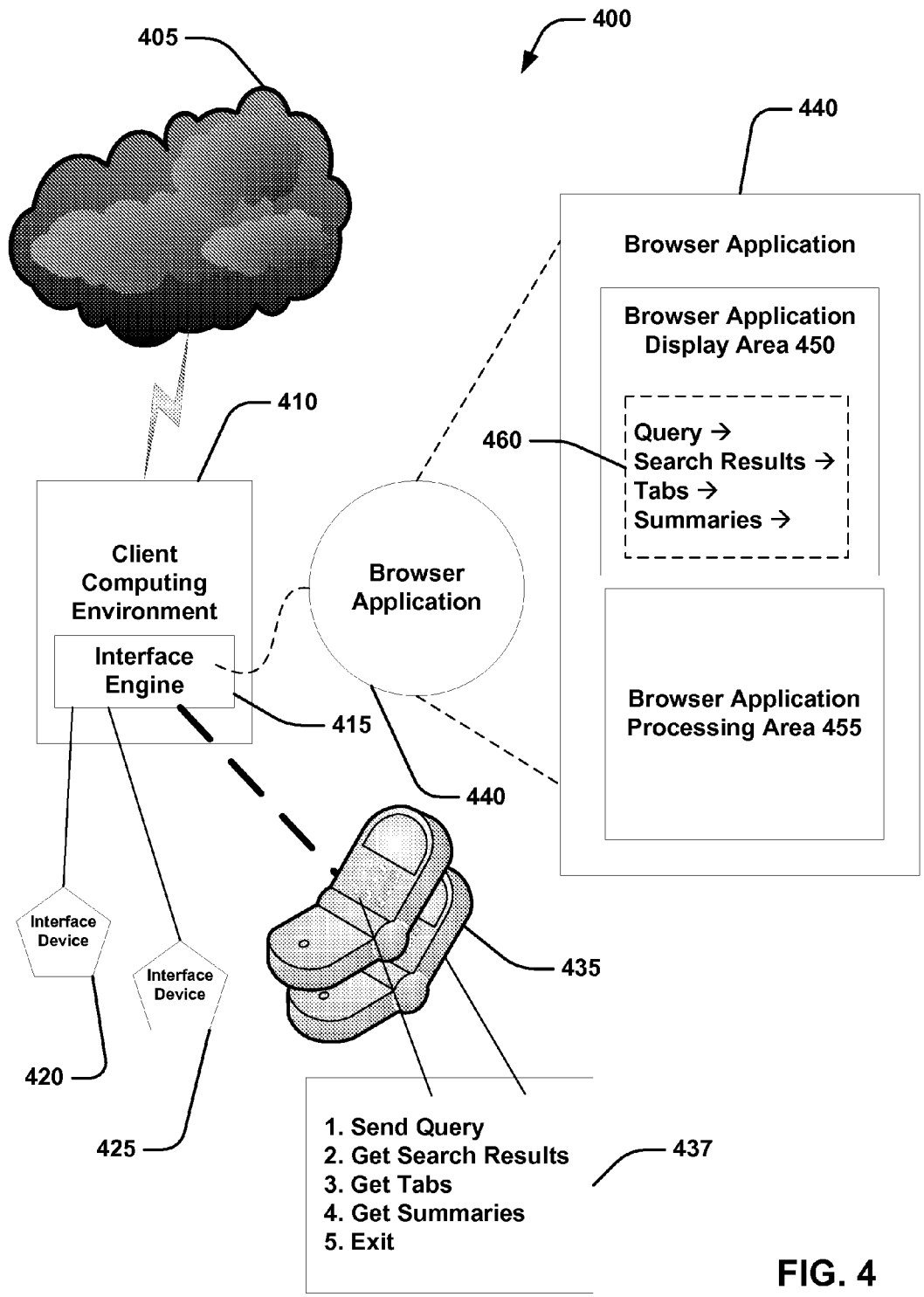
FIG. 4 is a block diagram of other exemplary components of an illustrative collaborative computing environment allowing for the collaborative retrieval, communication, and navigation of electronic content in accordance with the herein described systems and methods.

FIG. 4 schematically illustrates another collaborative electronic content environment 400. As is shown in FIG. 4, collaborative electronic content environment 400 comprises server network 405, client computing environment 410 having interface engine 415 and operating browser application 440, and a plurality of interface devices, 420, 425, and 435. Further as is shown, browser application comprises browser application display area 450 and browser application processing area 455.

In an illustrative operation, participating users (not shown) can interface with client computing environment 410 through browser application 440 using the plurality of interface devices 420, 425, and 435. In an illustrative implementation, one of the plurality of interface devices can act as a controlling interface device operable to exert control over one or more features/operations of browser application 440 such that the non-controlling interface devices are operable to control one or more pointers provided by browser application 440. The availability of a plurality of browser application pointers allows participating users (not shown) to indicate preference for electronic content retrieved and displayed by browser application 440 responsive to one or more inputs provided by interface devices 420, 425, and 435. The inputs representative of requests for electronic content can be processed by interface engine 415 operating on client computing environment 410 and cooperating with browser application 440 to display retrieved content (e.g., retrieved from one or more cooperating server computing environments (not shown) of server network 405) according to processing instructions provided by browser application processing area 455 for display in browser application display area 450.

Further, as is shown in FIG. 4, interface devices 435 can comprise wireless mobile devices (e.g., mobile phones, wireless personal digital assistants or other similar wireless computing environments) illustratively operable to cooperate with interface engine 415 operable on client computing environment using a selected wireless communications protocol (e.g., BLUETOOTH, 802.11x, etc.) to provide inputs representative of requests for electronic data. Further, as is shown, interface devices 435 can submit one or more commands 437 via interface engine 415 cooperating with browser application 440 for execution by browser application 440. In an illustrative operation, responsive to the commands provided by wireless interface devices 435, browser application can process the commands in browser application processing area 455 and display the results of the command execution 460 in browser application display area 450. Further, in the illustrative operation, data responsive to the command input can be wirelessly communicated by browser application 440 through cooperation of interface engine 415 to interface devices 435 for consumption (e.g., the client computing environment can be wirelessly enabled to allow for the wireless communication of data between client computing environment and wireless interface devices 435).

In an illustrative implementation, wireless interface devices 435 can submit one or more commands for execution by browser application 440 from illustrative command menu 437, which can operatively allow participating users to enter query terms, view query results, navigate through query result links, receive universal resource locator (URL) addresses for desired content which can be displayed, navigated, and/or communicated on an exemplary computing application operating on the in the wireless interface device, and/or navigate through retrieved electronic data responsive to a request for data using the wireless interface devices' keypad, and send such commands to browser application 440 operating on client computing environment 410 using one or more exemplary wireless communications protocols including but not limited to short message service (SMS). Exemplary search queries (along with any queries entered by a participating user controlling the client computing environment 410 text input capability through interface device 420) can be color-coded according to the issuing user and can be added to as an additional input requesting electronic data.

Figure 5:
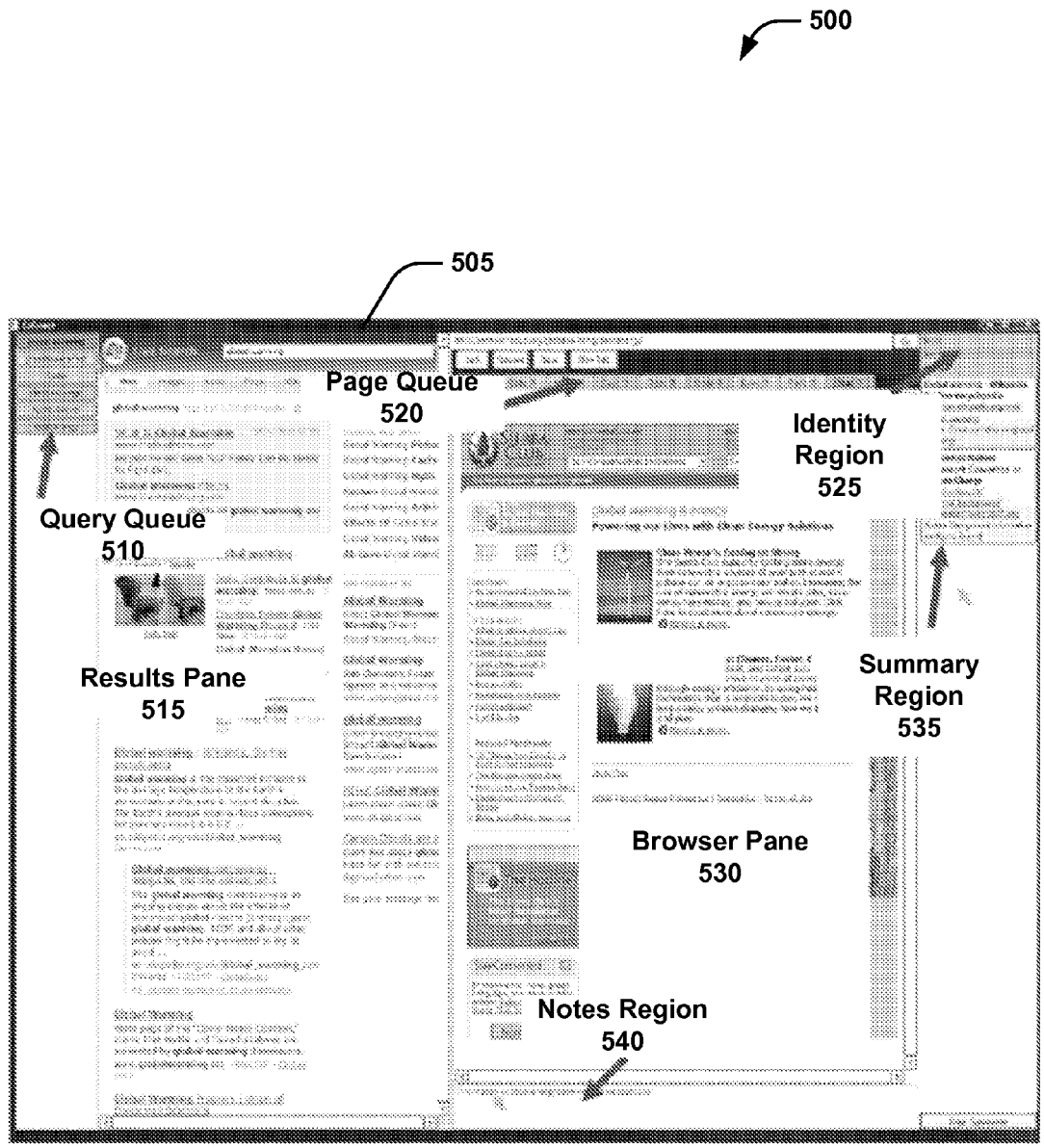
FIG. 5 is a flow diagram of one example of an illustrative display panel allowing for the navigation and display of electronic content according to a selected collaborative display paradigm.

FIG. 5 is a block diagram of exemplary electronic content display environment 500. As is shown in FIG. 5, display pane 505 comprises various display pane portions according to a selected display paradigm (not shown). Such display pane portions can illustratively comprise query queue 510 operative to display inputted search queries, page queue 520, identify region 525, summary region 535, browser pane 530, and notes region 540. In an illustrative operation, page queue 520 can display, in a tabbed-enabled browser computing application, electronic content that has been retrieved in response to received inputs from cooperating interface devices. In the illustrative operation, the results pane can display electronic data for the observed search query (i.e., a search query that has been processed from query queue 510). Browser pane 530 can display electronic content for the observed page from page queue 520. Illustratively operatively, notes region 540 can receive inputs from participating users regarding one or more pages observed in browser pane 530. Summary region 535, in the illustrative operation, can display (and process) data representative of a summary of electronic content displayed in results pane 515 and/or browser pane 530. In the illustrative operation, the summary region can support functionality to allow for the electronic communication of generated summaries via e-mail (or other form of electronic communication) to one or more participating users.

In an illustrative implementation, two or more participating users can interface with a computing environment operating an electronic content collaborative search session using two or more interface devices. In the illustrative implementation, the cooperating interface devices (e.g., participating users) can operate to control a unique pointing instrument on a cooperating graphical user interface (e.g., unique mouse cursor shape that can be distinguished by color. In the illustrative implementation, individual cursors can serve as proxies for on-screen pointing, an important aspect of communication that can be difficult for group members that are far from the shared display in status-quo scenarios. Participating users can optionally enter their names in identity region 525 in order to clarify which cursor color is associated with which group member (since in the basic usage scenario the only means of entering text is through the single keyboard, text entry must be mediated by social protocols as in the status quo computer-sharing scenario). Additionally, the computing environment can receive data representative of the participating users' identification from the one or more cooperating interface devices (e.g., wireless interface devices 435 of FIG. 4) for display in identity region 525.

In an illustrative operation, when the user with the keyboard enters a query in the search box, the results can appear in results pane 515. Illustratively, a group member can click on a search result using her own cursor. Illustratively, clicking a result can cause a new browser tab to appear in page queue region 520 that can be color-coded according to the user who opened it. New tabs can be sent to the back of the page queue 520 (i.e., the page shown in the browser pane 530 does not change as new tabs are added to the queue so as to prevent disruption to other group members possibly still viewing the current page). Clicking on a tab in the queue selects it, bringing its associated page to the forefront in browser pane 530.

A group member can also click on links within the page (not shown) in browser pane 530, which can serve to add the link's target to the back of page queue 520 in a color-coded tab. Page queue 520 can be designed to address the problems of drivers (i.e., participating user having control over a controlling interface device) being overwhelmed with suggestions from observers and observers having their suggestions ignored by drivers, by creating a means for all group members to indicate items they are interested in exploring without disruption.

In the illustrative implementation and as shown in FIG. 5, display pane 505 can comprise notes region 540 operable to receive inputs from participating users representative of notes about desired and/or retrieved electronic content.

Figure 6:
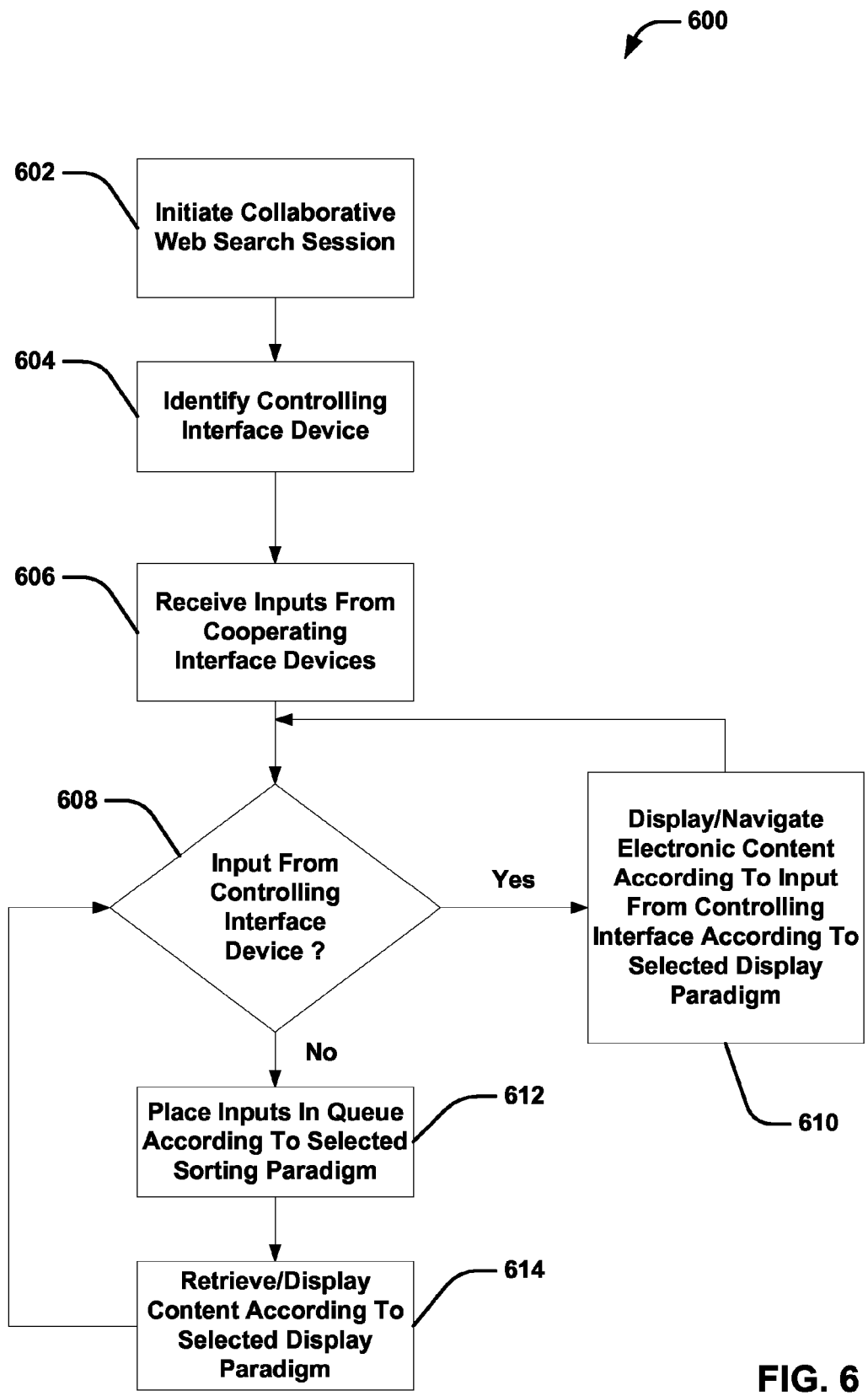
FIG. 6 is a flow diagram of one example of an illustrative method performed for collaborative retrieval, communication, and navigation of electronic content.

FIG. 6 is a flow diagram of one exemplary method 600 allowing electronic content collaboration. As is shown in FIG. 6, processing begins at block 602 where a collaborative web search session is initiated. From there, processing proceeds to block 604 where the controlling interface is identified. In an illustrative implementation, the collaborative web search session can receive inputs from various cooperating interface devices (e.g., via wirelessly and fixed-wire communications). In the illustrative implementation, one of the various cooperating interface devices can act as the controlling input device (e.g., providing text inputs for search queries) and used to assist in managing one or more display queues for displayed electronic content that can be responsive to one or more received inputs from the cooperating interface devices. From block 604, processing proceeds to block 606 where one or more inputs are received from cooperating interface devices. A check is then performed at block 608 to determine if the received input was provided by the controlling interface device. If the check at block 608 indicates that the received input was provided by the controlling device processing proceeds to block 610, where the electronic content is displayed/navigates according to the received input from the controlling interface device according to a selected display paradigm. Processing then reverts to block 608 and proceeds from there.

However, if the check at block 608 indicates that the received input is not from the controlling interface device, processing proceeds to block 612 where the received inputs are placed in a queue according to a selected sorting paradigm. Processing then proceeds to block 614 where electronic content is retrieved according to a selected display paradigm. Processing then reverts to block 608 and continues from there.

The methods can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 7:
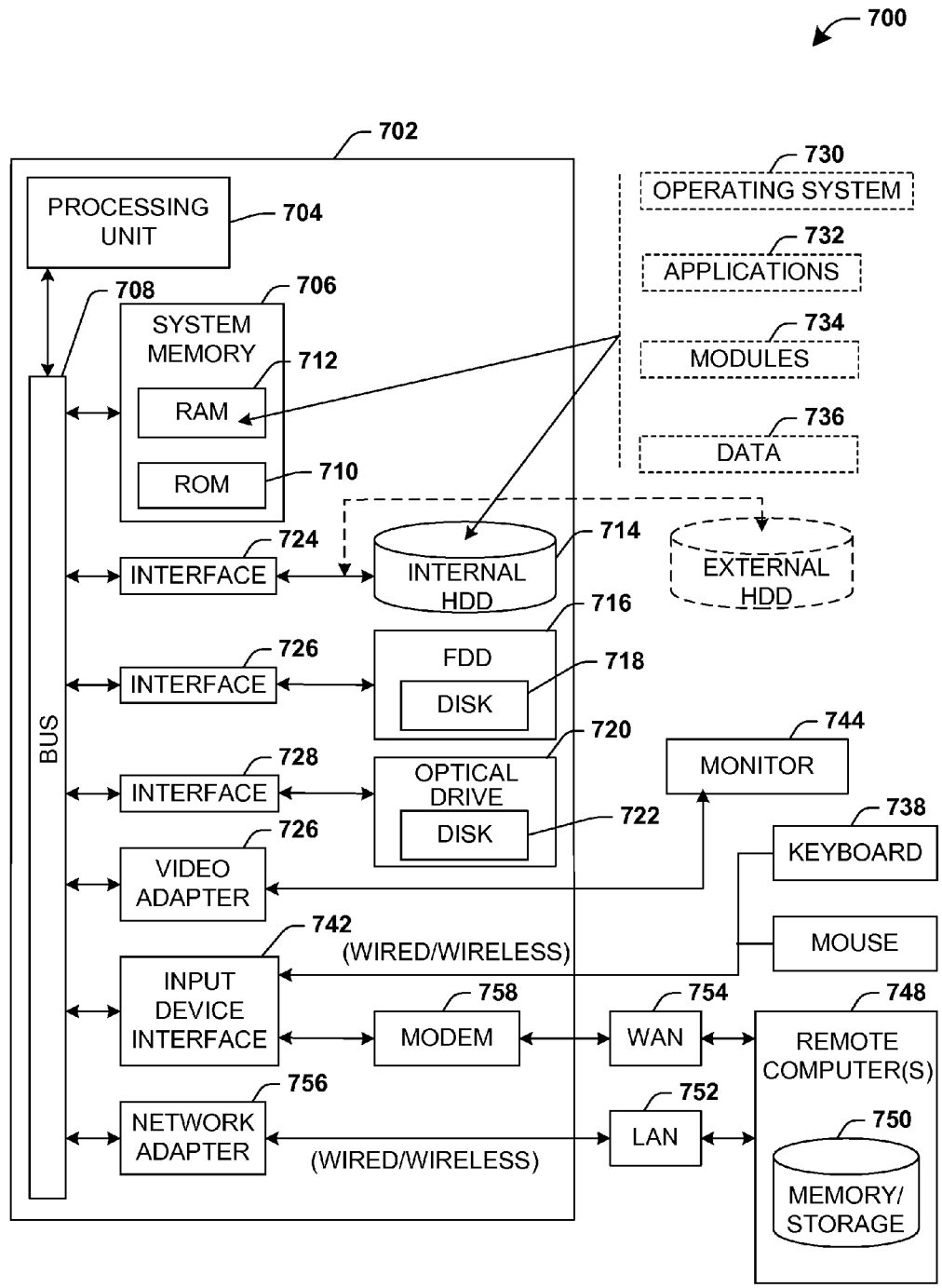
FIG. 7 is a block diagram of an illustrative computing environment in accordance with the herein described systems and methods.

FIG. 7 illustrates a block diagram of a computer operable to execute the disclosed architecture. In order to provide additional context for various aspects of the subject specification, FIG. 7 and the following discussion are intended to provide a brief, general description of a suitable computing environment 700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

More particularly, and referring to FIG. 7, an example environment 700 for implementing various aspects as described in the specification includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the specification can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are example and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
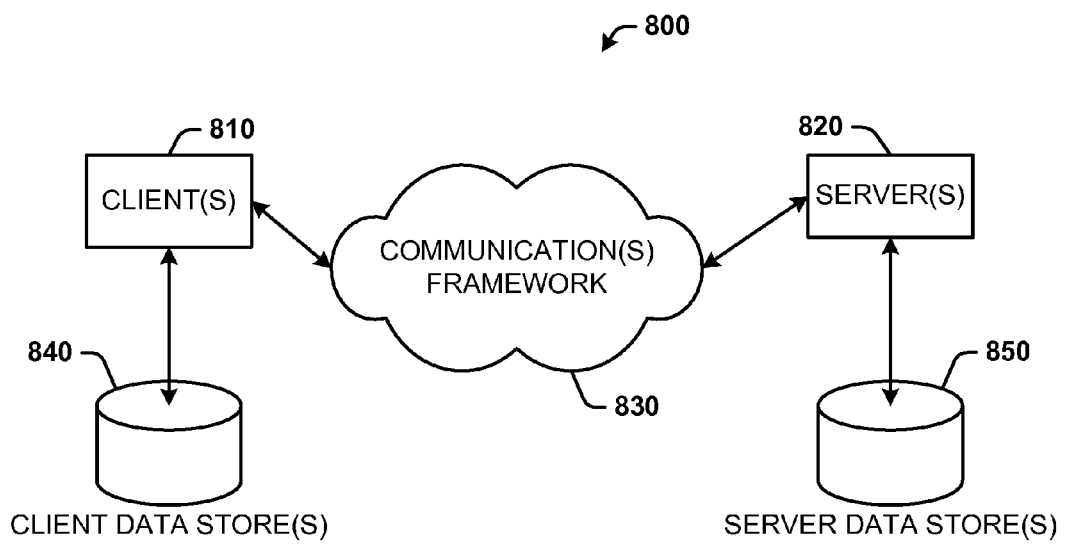
FIG. 8 is a block diagram of an illustrative networked computing environment in accordance with the herein described systems and methods.

Referring now to FIG. 8, there is illustrated a schematic block diagram of an exemplary computing environment 800 in accordance with the subject invention. The system 800 includes one or more client(s) 810. The client(s) 810 can be hardware and/or software (e.g., threads, processes, computing devices). The client(s) 810 can house cookie(s) and/or associated contextual information by employing the subject invention, for example. The system 800 also includes one or more server(s) 820. The server(s) 820 can also be hardware and/or software (e.g., threads, processes, computing devices). The servers 820 can house threads to perform transformations by employing the subject methods and/or systems for example. One possible communication between a client 810 and a server 820 can be in the form of a data packet adapted to be transmitted between two or more computer processes. The data packet may include a cookie and/or associated contextual information, for example. The system 800 includes a communication framework 830 (e.g., a global communication network such as the Internet) that can be employed to facilitate communications between the client(s) 810 and the server(s) 820.

Communications can be facilitated via a wired (including optical fiber) and/or wireless technology. The client(s) 810 are operatively connected to one or more client data store(s) 840 that can be employed to store information local to the client(s) 810 (e.g., cookie(s) and/or associated contextual information). Similarly, the server(s) 820 are operatively connected to one or more server data store(s) 850 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system allowing collaborative retrieval, search, communication, and navigation of electronic content, the system comprising:

a computer implementing a content interface engine operative to process one or more inputs to retrieve, search, communicate, and/or navigate electronic content by manipulating pointers concurrently displayed and operated in a window of a browser according to the inputs, the inputs having been received from a plurality of interface devices having respective connections to the computer and concurrently controlling the browser, each pointer corresponding to a respective interface device, each interface device comprising a computing device, the browser executing on the computer;

the content interface engine, executed by the computer, processing the inputs to cause the browser to retrieve, search, communicate, and/or navigate electronic content responsive to the received inputs, the window having a content display area that displays a web page of the electronic content with links therein and a browsing area displaying page indicators that respectively represent clicked search results added to a collection of loaded pages, wherein the clicked search results added to the collection of loaded pages are not displayed, and wherein the page indicators comprise tabs;

only one of the interface devices being designated a controlling interface device, wherein the content interface engine processes the inputs to retrieve pages corresponding to selected links, where the content interface engine handles retrieved pages according to whether a link was selected based on an input from the controlling interface device or based on an input from at least one interface device other than the controlling interface device, the handling of the retrieved pages performed such that:

pages obtained by link selection according to input received from the controlling interface device are displayed in the window and become the at displayed web page in a results pane of the window; and pages obtained by link selection according to inputs received from interface devices other than the controlling device are added to the collection of loaded pages queue become inactive web pages, are not displayed in the window, and are represented by respective tabs in the window of the browser.

2. The system as recited in claim 1, further comprising a communications interface operative to electronically communicate data between the content interface engine and one or more cooperating computing environments.

3. The system as recited in claim 1, wherein the content interface engine comprises a portion of a computing application.

4. The system as recited in claim 1, wherein the interface devices comprise pointing devices or client computing devices.

5. The system as recited in claim 4, wherein the interface devices are operative to communicate with the content interface engine employing a fixed wire and/or wireless communications interface.

6. The system as recited in claim 1, wherein the inputs of the interface devices are queued by the content interface engine.

7. The system as recited in claim 1, wherein the interface devices are operative to control and/or navigate electronic content displayed in the window.

8. A method for facilitating a collaborative electronic content session, the method comprising:

receiving inputs at a host computing device, during a collaborative electronic content session directed to a browser executing on the host computing device, the inputs from two or more interface devices connected to the host computing device, the interface devices being operated by respective users, the host computing device executing the browser which has a currently displayed page and which has a collection of loaded pages that are not displayed and are respectively represented by tabs, the interface devices comprising computing devices that users thereof interact with to control respective pointers concurrently displayed and operated in a same window of the same browser on the host computing device to direct inputs to the browser, the pointers respectively controlled by the interface devices, wherein only one of the pointers is currently designated a controlling pointer;

wherein each of the interface devices directs inputs to manipulate the pointers, respectively, thereby selecting links in the currently displayed page; and processing the inputs to select the links by retrieving corresponding web pages and continuing to display the currently displayed page, where pages of links selected by a pointer other than the controlling pointer are added to the collection of loaded pages, are not displayed, and are represented by tabs, and where a link selected by the controlling pointer in the window causes a corresponding web page to be retrieved and to become the currently displayed page.

9. The method as recited in claim 8, further comprising displaying a search queue comprised of query strings, wherein any of the interface devices can add a query string to the query queue.

10. The method as recited in claim 9, further comprising receiving one or more inputs from the interface devices representative of one or more search queries.

11. The method as recited in claim 10, further comprising processing the one or more search queries of the search queue and in response displaying search results as a new currently displayed page.

12. The method as recited in claim 8, further comprising receiving the inputs from the interface devices via corresponding wireless connections between the interface devices and the host computer.

13. A user interface of a browser displayed on a display, and comprising:

a browser display area displaying a query area, a search results area, and a browsing area including a plurality of page indicators, the browsing area having a current page of electronic content with links therein that is displayed and a collection of loaded pages comprising clicked search results that are not displayed and are represented by respectively displayed page indicators, the page indicators comprising tabs;

the query area displaying a plurality of query strings;

the search results area displaying a current search results from a search service, the current search results comprising selectable links and the current search results having been generated and sent by the search service responsive to one of the query strings having been sent to the search service;

a plurality of concurrently displayed and operated pointers displayed in the browsing area, each pointer controlled by a respective computing device of a plurality of computing devices through a corresponding connection to a computer on which the browser is executing; wherein the plurality of computing devices concurrently control the browser and the computer processes one or more inputs received from the plurality of computing devices to retrieve, search, communicate, and/or navigate electronic content, each pointer able to interact with the search results area, the browser display area, and the set of page indicators, wherein only one pointer of the pointers is currently designated as a controlling pointer; and wherein any one of the pointers is able to select any link(s) displayed in the current search results to retrieve and load corresponding pages based on whether or not a link was selected by the controlling pointer such that, wherein when the pointer that selected a link was the controlling pointer then the page loaded corresponding to the selected link becomes the current page that is displayed in the browsing area, and when the pointer that selected a link was not the controlling pointer then the page loaded corresponding to the selected link is added to the collection of loaded pages, is not displayed, and is represented by a new tab in the browsing area.

14. A according to claim 13, further comprising adding a new query string to the query area in accordance with input from one of the attached mobile devices.

15. A method according to claim 14, wherein the query strings are colored according to which of the mobile devices they are associated with.

* * * * *